March 15, 1955 P. F. BEAUSOLEIL 2,704,214
LATHE CHUCK WITH INDEPENDENTLY PAIRED JAWS
Filed Aug. 4, 1951
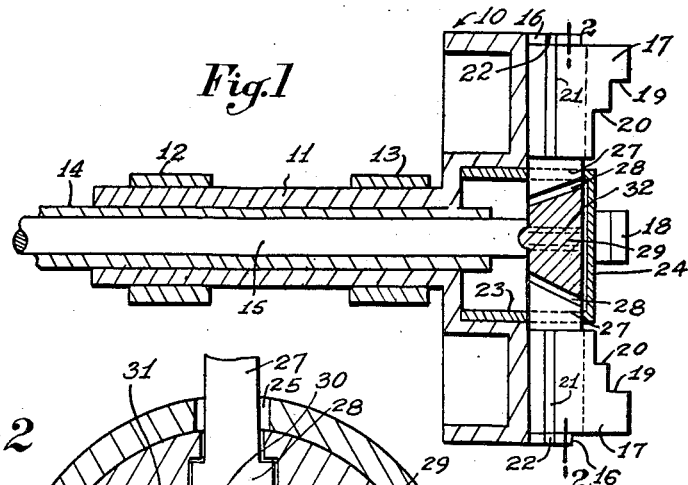
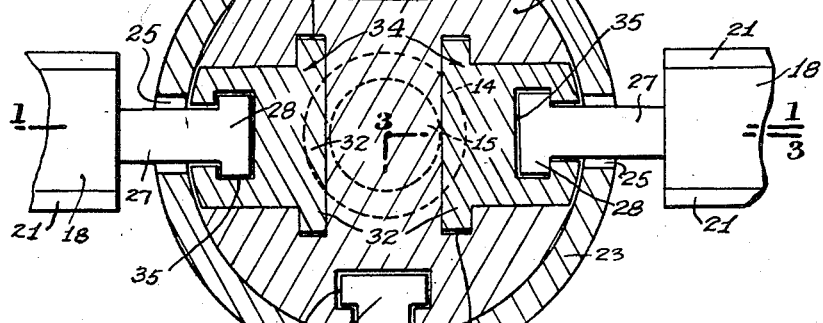
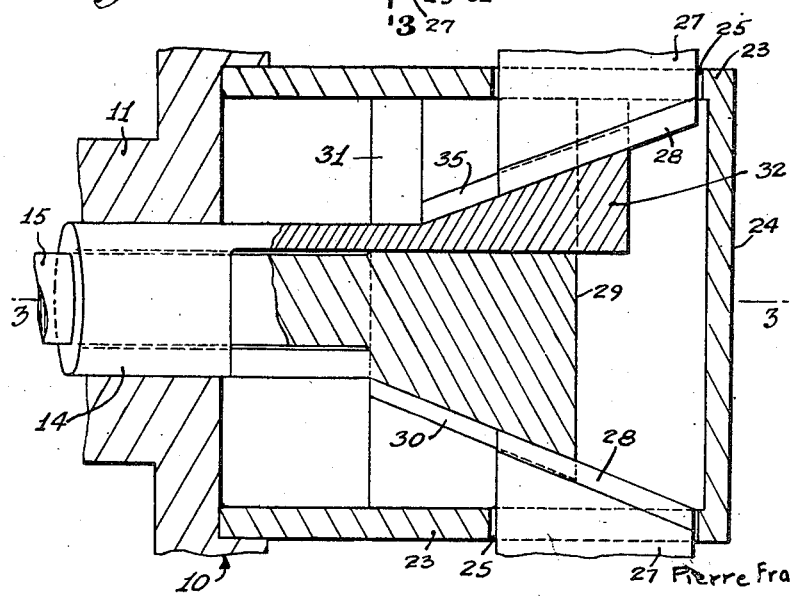
Inventor
Pierre François Beausoleil
By Richardson, David and Nordon
his ATT'YS.

United States Patent Office 2,704,214
Patented Mar. 15, 1955

2,704,214

LATHE CHUCK WITH INDEPENDENTLY PAIRED JAWS

Pierre François Beausoleil, L'Horme, France

Application August 4, 1951, Serial No. 240,388

Claims priority, application France August 4, 1950

4 Claims. (Cl. 279—121)

The present invention relates to a four-jawed chuck suitable for use in rotary power tools such as lathes, and more particularly to a self-centering chuck which may advantageously be controlled by power actuated means such as pneumatic or hydraulic apparatus.

The present invention comprises four radially movable work gripping jaws and actuating mechanism which converts two simultaneous and independent movements along the axis of the lathe into work gripping or releasing radial movements of pairs of opposed jaws at the face plate of the lathe or other machine, the movements of each pair being independent, but symmetrical in each pair.

As compared with conventional lathe chucks, the chuck of the present invention affords a comparatively high resistance to the effects of centrifugal force and freedom from axial frictional forces which ordinarily accompany the gripping of the workpiece with a resulting loss in gripping efficiency.

Generally, the invention comprises a pair of concentric actuating rods one of which is hollow. The rods are independently movable. One of the rods terminates in a head which has a pair of symmetrical diametrically opposed axially outwardly divergent T-slots formed therein. The other rod terminates in a fork with parallel legs which pass freely slidably through the head, the fork having a similar pair of diametrically oppositely disposed T-slots formed therein of which the longitudinal axes lie in a plane perpendicular to the plane of the longitudinal axes of the pair of T-slots in the head, the line of intersection of these two planes being the common rotational axis of the chuck and the actuating rods. Each of the four jaws has a radially inwardly located end projection or head formed thereon which slidably engages one of the T-slots whereby axial movement of either control rod will produce an accompanying symmetrical radial movement of a single pair of diametrically opposed jaws.

Accordingly, an object of the invention is the provision of a power actuable lathe chuck in which each of a plurality of opposed pairs of jaws is radially movable independently of any other pair, the movements of each pair being symmetrical with respect to the rotational axis of the chuck, whereby a self-centering of the workpiece is obtained.

Other and further objects, features and advantages of the invention will appear upon reading the following specification together with the accompanying drawing forming a part hereof.

Referring to the drawing:

Figure 1 is a longitudinal sectional view taken along the line 1—1 of Fig. 2.

Figure 2 is an enlarged fragmentary transverse sectional view taken along the line 2—2 of Fig. 1.

Figure 3 is an enlarged fragmentary composite sectional view taken along two mutually perpendicular radial planes indicated at 3—3—3 in Fig. 2.

Referring to Fig. 1, the chuck comprises a round main body designated generally as 10 which is integrally formed with a hollow power driven shaft 11. The shaft 11 extends to suitable drive mechanism (not shown) for turning the chuck. The power shaft 11 is shown journaled in bearings 12 and 13. A hollow tubular actuating rod 14 is freely coaxially slidable in power shaft 11 and rotates therewith. A solid actuating rod 15 of circular cross-section is freely coaxially slidable in the hollow actuating rod 14 and rotates along with the hollow rod 14, the power shaft 11 and the chuck body 10.

The outwardly directed circular face of the chuck body 10 has four regularly arranged open-ended radial slots 16 formed therein in which two pairs of gripping jaw members 17 and 18 are freely slidably disposed. The jaw members 17 and 18 are each shown provided with two inwardly directed gripping faces 19 and 20 disposed at different radial distances from the center of the chuck body 10 for engagement with workpieces of different dimensions. The jaw members 17 and 18 are provided with laterally extending tongues 21 which engage cooperating grooves 22 formed in the sides of radial slots 16. The tongues 21 and grooves 22 hold the jaw members 17 and 18 against axial movement toward the right with respect to the chuck body 10.

A hollow central cylindrical housing 23, closed at its outer end by an integrally formed transverse wall 24, is shown coaxially fixed in the chuck body 10 for rotation therewith. Four lateral apertures 25 are formed in the cylindrical wall of the central housing 23, each of the apertures 25 being located in alignment with one of the radial slots 16. Each of the gripping jaw members 17 and 18 comprises a radially inwardly located neck portion 27 which extends freely movably through one of the apertures 25 in housing 23 and terminates in an inner head 28 (Fig. 2) of T-shaped cross-section, the head 28 being inclined at an angle (Fig. 3) with respect to the rotational axis of the chuck body 10 to cause independent symmetrical radial movements of each of the two pairs of gripping jaw members 17 and 18 as described in greater detail below.

The inner solid actuating rod 15 terminates in an integrally formed cylindrical head 29 which is freely axially slidable in the cylindrical housing 23. The head 29 has a pair of diametrically oppositely disposed sloping slots 30 of T-shaped cross-section formed at its top and bottom as shown in Fig. 2, which slidingly receive the correspondingly shaped T-heads 28 of the pair of gripping jaw members 17.

At its sides, the cylindrical head 29 has a pair of axially extending parallel slots 31 formed therein which slidingly receive the diametrically oppositely disposed parallel legs 32 of a bifurcated actuating member 34 integrally formed at the right hand end of the hollow actuating rod 14 for axial movement therewith.

The parallel legs 32 of bifurcated member 34 are provided on their outer sides with sloping slots 35 which slidingly receive the correspondingly shaped T-heads 28 of the horizontal pair of jaw members 18.

The sloping slots 30 in the cylindrical head 29 and the sloping slots 35 in the bifurcated member 34 slope divergently outwardly toward the end wall 24 of the housing 23 at equal angles of inclination with respect to the rotational axis of the chuck. If extended, the longitudinal axes of each pair of the sloping slots 30 and 35 would intersect the rotational axis of the chuck body 10 substantially in a common point for each pair. The sloping slots 30 and 35 are of substantially equal lengths (Fig. 3) and their longitudinal midpoints are located at substantially equal radial distances from the rotational axis of the chuck body 10. In this manner, equal displacements of the hollow actuating rod 14 and of the solid actuating rod 15 will produce the equal and symmetrical radial movements of the horizontally spaced gripping jaws 18 and the vertically spaced gripping jaws 17, respectively. Movement of either actuating rod alone will produce an independent and axially symmetrical movement of the particular pair of gripping jaws which it controls. The chuck is therefore self-centering with respect to its gripping action on a non-circular workpiece.

The two actuating rods 14 and 15 may extend to any suitable mechanism for producing independent axial movement of each rod, and preferably such actuating mechanism will exert equal axial forces on each rod. Conveniently, such mechanism may include suitable hydraulic piston and cylinder apparatus (not shown) or it may include pneumatic or other conventional forms of power operated actuating mechanism. Manually operated mechanism may also be provided, if desired.

It will be readily understood that the invention is in no way limited to the single illustrative embodiment herein shown and described, but includes various modifications within the scope of the appended claims.

What is claimed is:

1. In a chuck of the class described, in combination: a revoluble chuck body having an outer face portion with a plurality of pairs of regularly arranged radially extending slots formed therein, the two slots of each pair being in alignment along a line passing through the rotational axis of said body; a plurality of interengaging independently axially slidable members disposed in said body, one such member being provided for each of said pairs of slots; a plurality of gripping jaw members each radially movably disposed in one of said slots, the gripping jaws being symmetrically aligned in pairs with the two jaws of each pair disposed on opposite sides of said rotational axis; and connecting means symmetrically connecting the gripping jaw members of each pair to diametrically oppositely disposed portions of one of said axially slidable members, said connecting means including means for producing symmetrical radial movements of both jaws of each pair in response to axial movement of the particular slidable member to which said pair of jaws is connected.

2. A chuck according to claim 1, in which said axially slidable members have diametrically oppositely disposed pairs of elongated sloping slots formed therein, the longitudinal axes of each pair of said slots, if extended, intersecting the rotational axis of said body substantially in a common point, and wherein said connecting means comprises a radially inwardly disposed head portion on each of said gripping jaw members which slidably engages one of said sloping slots.

3. A chuck according to claim 2, in which said sloping slots are of T-shaped cross-sectional configuration, and wherein said jaw member head portions are of cooperating T-shaped cross-sectional configuration for sliding engagement with said sloping slots.

4. In a four-jawed chuck of the class described; a revoluble circular chuck body having an outer face portion with four regularly arranged radial slots formed therein; a head member axially slidable in said body and having a pair of diametrically oppositely disposed sloping slots of T-shaped cross-sectional configuration formed therein and a pair of diametrically oppositely disposed spaced parallel axially extending slots formed therein, the longitudinal axes of said pair of sloping slots and of said pair of parallel slots lying in mutually perpendicular planes; a bifurcated member having spaced parallel leg portions slidably disposed in said axially extending parallel slots, the outer portions of the legs of said bifurcated member having a pair of sloping slots similar to the sloping slots of said head member formed therein, the longitudinal axes of each pair of said sloping slots, if extended, intersecting the rotational axis of said chuck substantially in a common point; a first pair of gripping jaw members slidably disposed in two aligned ones of said regularly arranged radial slots, each of said jaw members having a radially inwardly disposed head portion of cooperating T-shaped cross-sectional configuration in sliding engagement with one of the sloping slots of said head member; a second pair of aligned gripping jaw members slidably disposed in the other two of said four radial slots, each of said second pair of jaw members having a radially inwardly disposed head portion of cooperating T-shaped cross-sectional configuration in sliding engagement with one of the sloping slots of said bifurcated member; a first actuating means extending axially beyond said chuck body and connected to said head member for causing axial movement thereof; and a second actuating means extending axially beyond said chuck body, said second actuating means being independent of said first actuating means and connected to said bifurcated member for causing axial movement thereof.

References Cited in the file of this patent

UNITED STATES PATENTS

| | | |
|---|---|---|
| 1,052,087 | Niedhammer | Feb. 4, 1913 |
| 1,305,138 | McClellan | May 27, 1919 |
| 1,420,682 | Bright | June 27, 1922 |
| 1,864,423 | Forkardt | June 21, 1932 |

FOREIGN PATENTS

| | | |
|---|---|---|
| 681,799 | Great Britain | 1952 |